(12) United States Patent
Ericson et al.

(10) Patent No.: US 9,220,126 B2
(45) Date of Patent: Dec. 22, 2015

(54) METHOD AND APPARATUS FOR USER EQUIPMENT CONTROL IN A CELLULAR NETWORK

(75) Inventors: Marten Ericson, Lulea (SE); Jan Christoffersson, Lulea (SE); Hans Hannu, Lulea (SE); Andreas Hoglund, Solna (SE); Min Wang, Lulea (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 111 days.

(21) Appl. No.: 14/240,939

(22) PCT Filed: Aug. 30, 2011

(86) PCT No.: PCT/SE2011/051036
§ 371 (c)(1),
(2), (4) Date: Feb. 25, 2014

(87) PCT Pub. No.: WO2013/032376
PCT Pub. Date: Mar. 7, 2013

(65) Prior Publication Data
US 2014/0219089 A1  Aug. 7, 2014

(51) Int. Cl.
*H04W 76/04* (2009.01)
*H04W 28/02* (2009.01)
*H04W 24/08* (2009.01)
*H04W 52/02* (2009.01)

(52) U.S. Cl.
CPC ............ *H04W 76/046* (2013.01); *H04W 24/08* (2013.01); *H04W 28/0221* (2013.01); *H04W 28/0289* (2013.01); *H04W 52/0222* (2013.01)

(58) Field of Classification Search
None
See application file for complete search history.

(56) References Cited

U.S. PATENT DOCUMENTS

| | | | |
|---|---|---|---|
| 2004/0218533 A1* | 11/2004 | Kim et al. | 370/235 |
| 2006/0240782 A1* | 10/2006 | Pollman et al. | 455/67.11 |
| 2008/0008127 A1 | 1/2008 | Choi et al. | |
| 2008/0076442 A1 | 3/2008 | Ishii et al. | |
| 2008/0123548 A1 | 5/2008 | Ranta-aho et al. | |
| 2009/0046667 A1 | 2/2009 | Pelletier et al. | |
| 2010/0008229 A1 | 1/2010 | Bi et al. | |
| 2010/0144363 A1 | 6/2010 | De Rosa et al. | |
| 2011/0122818 A1* | 5/2011 | Dwyer et al. | 370/328 |

FOREIGN PATENT DOCUMENTS

WO    2006059932 A1    6/2006

OTHER PUBLICATIONS

Supplementary European Search Report issued on Mar. 16, 2015 in corresponding European application No. 11871742.0, 7 pages.

* cited by examiner

*Primary Examiner* — Ashley Shivers
(74) *Attorney, Agent, or Firm* — Patent Portfolio Builders, PLLC (57) ABSTRACT

The present invention relates to an apparatus and method for controlling a number of user equipments operating in a cellular network. The method comprises receiving an indication that a rise-over-thermal (RoT) measured in a cell is above a threshold. In response to reception of the indication, it is determined (52) if a user equipment, which is in a Radio Resource Control, RRC, state CELL_DCH and served by the cell, has a low data activity in the uplink According to the method, a user equipment, which is in the RRC state CELL_DCH, is served by the cell and is determined to have a low data activity in the uplink, is triggered (54) to change state to a RRC state CELL_FACH. Thereby the contribution of the user equipment to the RoT of the cell may be reduced and it may be possible to avoid dropping users due to congestion control in case of unacceptably high RoT in the cell.

25 Claims, 6 Drawing Sheets

METHOD AND APPARATUS FOR USER EQUIPMENT CONTROL IN A CELLULAR NETWORK

CROSS-REFERENCE TO RELATED APPLICATION

This application is a 35 U.S.C. §371 National Phase Entry Application from PCT/SE2011/051036, filed Aug. 30, 2011, and designating the United States.

TECHNICAL FIELD

The embodiments described herein relates to controlling a number of user equipments operating in a cellular network and in particular to user equipment control in relation to a rise-over thermal (RoT) level in a cell.

BACKGROUND

High-Speed Packet Access (HSPA) provides a major extension of the Wideband Code Division Multiple Access (WCDMA) radio interface. With HSPA it is now possible to provide mobile broadband using High-Speed Downlink Packet Access (HSDPA) and High-Speed Packet Uplink Access (HSUPA). Thus, HSPA can be seen as a complement and replacement to other types of broad band access such as Asymmetric Digital Subscriber Line (ADSL).

In WCDMA, cells may become overloaded. The overload may be due to several reasons and may result in different problems, such as too high downlink (DL) transmit power, starvation in an uplink (UL) scheduler or too high UL rise-over-thermal (RoT). The RoT indicates the ratio between the total power received from wireless sources at a base station and the thermal noise. The RoT is typically used as a measure of how congested a cellular network is. The RoT is especially important to keep under control, since if it becomes too high the system may become unstable and very high RoT values may occur. Therefore the capacity of the cellular network is often determined by how high the acceptable RoT is. A too high RoT decreases the coverage and may lead to dropping of some services, especially for users close to the cell border. To avoid this, there is typically a congestion control (CC) function that takes actions in a controlled manner if the RoT becomes too high. The congestion control function may take action to lower the rate for user equipments (UEs) in a CELL_DCH state or even drop users if necessary.

The dominant mobile broad band service today is downlink dominated, using an interactive bearer such as HSDPA and HSUPA, also known as Enhanced Uplink (EUL). Services such as video-sharing via a website, e.g. YouTube, and web browsing are examples of services that give rise to downlink heavy traffic. Even though these services are down-link heavy, the uplink in WCDMA still creates a lot of interference and contributes to raising the RoT. The reasons for this are the continuous control signalling in UL and the TCP HTTP (Transmission Control Protocol Hypertext Transfer Protocol) request and ACK/NACKs (acknowledgements/negative acknowledgements) in the UL. This means that the UL must reside in an active state since there is either DL transmission to receive or occasional UL data to transmit, and this creates interference and increases the RoT.

When congestion occurs in a cell due to too high UL RoT, typically the only option left is to release a random interactive bearer. This gives a negative impact on the user quality of service (QoS) which it is of interest to try to avoid.

SUMMARY

It is an object to provide a method and apparatus which improves the possibilities of keeping negative impact on user QoS caused by congestion control down.

The above stated object is achieved by means of a method and apparatus according to the independent claims.

A first embodiment provides a method in a network node for controlling a number of user equipments operating in a cellular network. The method comprises receiving a first indication that a rise-over-thermal (RoT) measured in a first cell is above a first threshold. The method further comprises, in response to reception of the first indication, determining if at least one user equipment, which is in a Radio Resource Control, RRC, state CELL_DCH and served by the first cell, has a low data activity in the uplink. A user equipment is determined to have a low data activity in the uplink if measured traffic of the user equipment fulfills a set of selected requirements for low data activity in the uplink. The method also comprises selecting at least one user equipment, which is in the RRC state CELL_DCH, is served by the first cell and is determined to have a low data activity in the uplink and triggering change of RRC state for the selected user equipment(s) from the RRC state CELL_DCH to a RRC state CELL_FACH.

A second embodiment provides an apparatus for controlling a number of user equipments operating in a cellular network. The apparatus comprises a receiver configured to receive a first indication that a RoT, measured in a first cell is above a first threshold. The apparatus further comprises data processing circuitry. The data processing circuitry is configured to, in response to reception of said first indication, determine if at least one user equipment, which is in a RRC state CELL_DCH and served by the first cell, has a low data activity in the uplink. A user equipment is determined to have a low data activity in the uplink if measured traffic of the user equipment fulfills a set of selected requirements for low data activity in the uplink. The data processing circuitry is further configured to select at least one user equipment, which is in the RRC state CELL_DCH, is served by the first cell and is determined to have a low data activity in the uplink. The data processing circuitry is also configured to trigger change of RRC state for the selected user equipment(s) from the RRC state CELL_DCH to a RRC state CELL_FACH.

An advantage of certain embodiments described herein is that they make it possible to keep the RoT level in a cell down. By keeping the RoT down, dropping of users due to congestion control caused by too high RoT can hopefully be avoided.

Another advantage of some embodiments described herein is that they can be easily combined with other types of congestion control and measures for keeping RoT down. It is e.g. possible to provide early congestion control with limited negative impact on user QoS before more drastic congestion control measures, which affect user QoS more severely, are taken. Even if a RRC state change from CELL_DCH to CELL_FACH may lower the QoS experienced by a user, it is a much less negative impact than dropping the user completely.

Further advantages and features of embodiments of the present invention will become apparent when reading the following detailed description in conjunction with the drawings.

DETAILED DESCRIPTION

The present invention will now be described more fully hereinafter with reference to the accompanying drawings, in which different exemplary embodiments are shown. These exemplary embodiments are provided so that this disclosure will be thorough and complete and not for purposes of limitation.

According to some of the embodiments that will be described in further detail below some users are switched or moved from a CELL_DCH state to a CELL_FACH state before a congestion indicator is reached even though the user is considered active, i.e. still transmits data on downlink (DL) or uplink (UL). The users subjected to this switch are users with user equipments (UEs) that have a low data activity in the uplink. There are different requirements that can be used and considered in order to determine if a UE has low data activity in the UL. Users who are using services that create an occasional HTPP request and ACK/NACKs, i.e. web browsing are generally considered to have a low data activity in the UL. Switching some users to CELL_FACH may reduce the UL interference since it is possible to completely turn off the Dedicated Physical Control Channel (DPCCH) in between the occasional UL transmissions.

Figure 1:
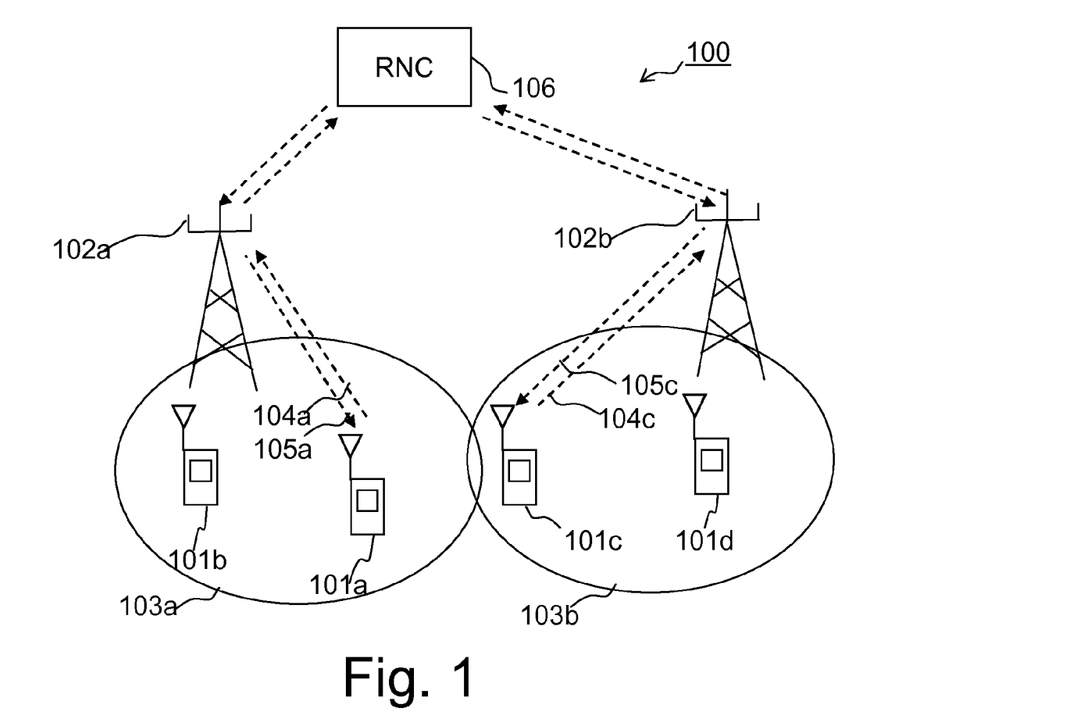
FIG. 1 is a schematic block diagram of a communication system in which embodiments of this disclosure may be implemented.

FIG. 1 illustrates an example of a cellular network 100, in which embodiments of this disclosure may be implemented. The exemplary cellular network 100 is part of a High-Speed Packet Access (HSPA) system. For the sake of simplicity, only those parts of the HSPA system that are of particular relevance to the embodiments discussed herein are shown. The cellular network 100 includes a base station 102a, serving UEs 101a and 101b in a cell 103a. The cellular network 100 also includes a base station 102b, serving UEs 101c and 101d in a cell 103b. A base station is a common implementation of a NodeB in WCDMA/HSPA so the base stations 102a and 102b will also be referred to as NodeB 102a and NodeB 102b respectively herein. The cellular network 100 may comprise a large number of radio base stations, but for simplicity only two are illustrated in FIG. 1. The UEs 101a-d are able to communicate their respective serving base station 102a, 102b via a number of uplink channels and a number of downlink channels. In FIG. 1 it is illustrated that the UE 101a is communicating with the radio base station 102a via uplink channel(s) 104a and downlink channel(s) 105a, while the UE 101c is communicating with the radio base station 102b via uplink channel(s) 104c and downlink channel(s) 105c. A Radio Network Controller (RNC) 106 controls the base stations 102a and 102b, and is, among other things, in charge of management of radio resources in cells 103a and 103b for which the RNC 106 is responsible.

Figure 2:
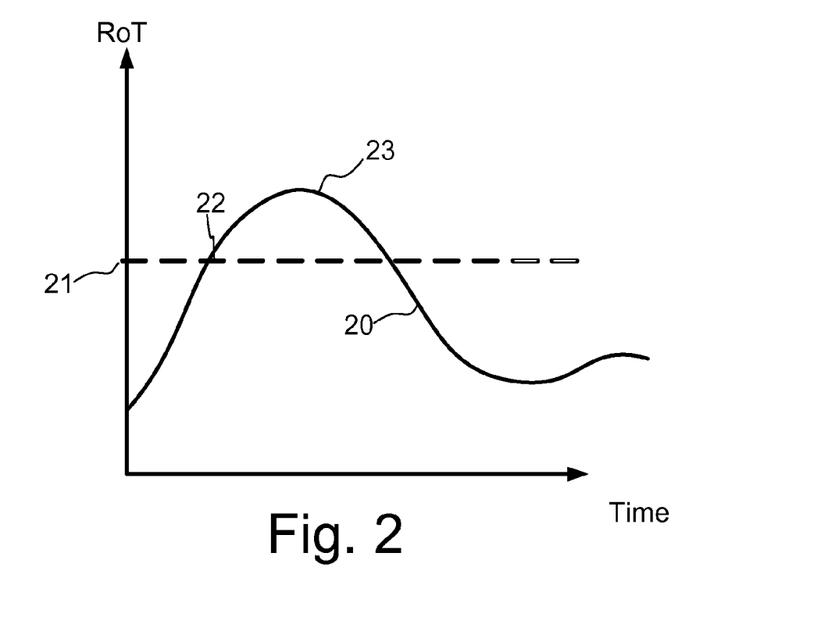
FIG. 2 is a diagram illustrating RoT over time in a Code Division Multiple Access (CDMA) system with typical congestion control.

A congestion control which is typical in CDMA systems may give rise to a RoT behaviour as illustrated in FIG. 2 in a cell of the cellular network 100. FIG. 2 illustrates RoT level 20 over time when a RoT limit 21, also referred to as congestion control indicator, is applied for triggering congestion control which involves dropping of users. When the RoT is too high, i.e. over the congestion control indicator 21, as illustrated at point 22, congestion control actions start which means that some users are dropped. After a while, at point 23, it can be seen that the RoT start to decrease due to the congestion control actions. The RoT then stabilizes at a lower level below the congestion control indicator 21.

Figure 3:
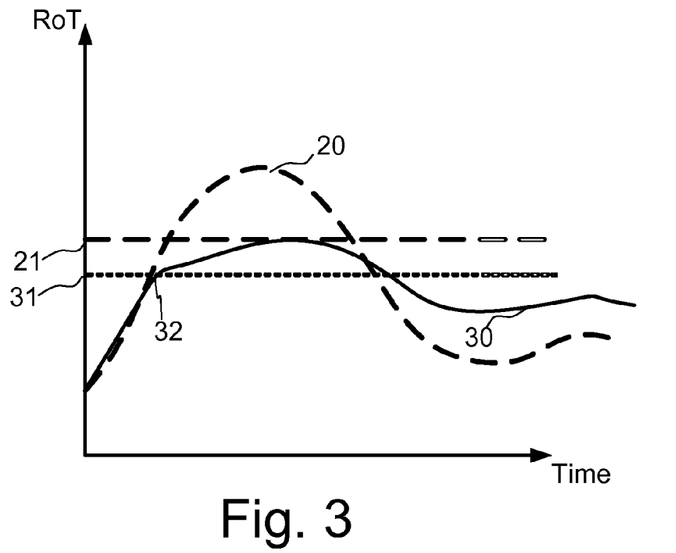
FIG. 3 is a diagram illustrating a comparison of RoT over time in a CDMA system with typical congestion control and a system with an embodiment of this disclosure implemented.

FIG. 3 is a diagram illustrating a comparison of RoT over time in a CDMA system with typical congestion control and a system with an embodiment of this disclosure implemented. The RoT level of a system with a typical congestion control is illustrated by a dashed curve 20. As mentioned above in connection with FIG. 2, according to the typical congestion control some users are dropped in case the RoT increases over a congestion control indicator 21. A solid curve 30 represents the RoT level of a system with an embodiment of this disclosure implemented. If the RoT rises above a first threshold 31, as illustrated at point 32, some suitable users are switched from the CELL_DCH state to the CELL_FACH state. This action has the benefit of saving RoT and will hopefully, as illustrated in this example, lead to a reduction or leveling out of the RoT such that it does not reach the congestion control indicator 21. Accordingly there may be no need to apply the typical congestion control and no need to drop users. Therefore capacity can be gained.

Figure 4:
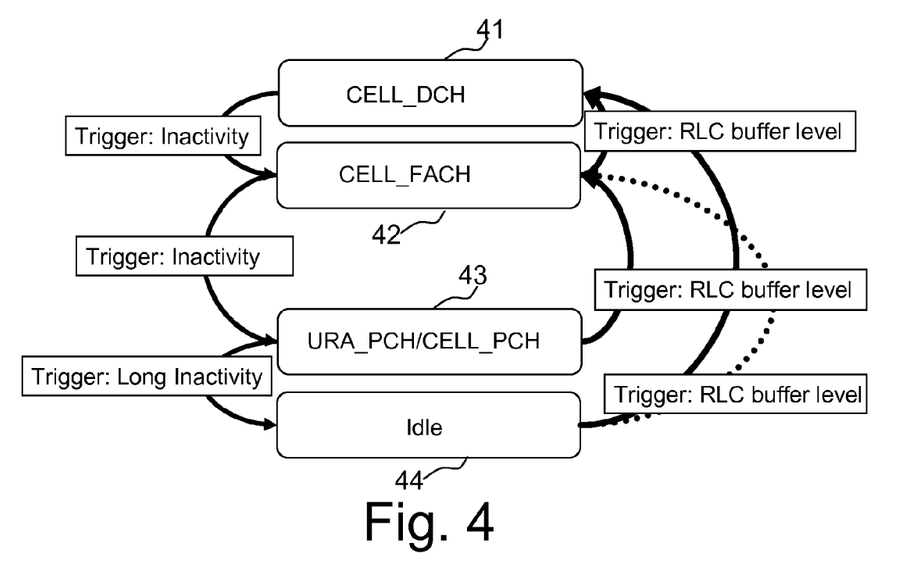
FIG. 4 is a schematic block diagram illustrating Radio Resource Control (RRC) states of a user equipment (UE) and possible transitions between the states.

To keep user equipment (UE) power consumption down most cellular systems have several states. In WCDMA there are five Radio Resource Control (RRC) states which are schematically illustrated in FIG. 4. These RRC states are Idle 44, CELL_DCH 41, CELL_FACH 42, URA_PCH 43, and CELL_PCH 43. Data transfer between the UE (also referred to as terminal herein) and the network is only possible in the CELL_FACH and CELL_DCH states.

From a user performance perspective it is desirable to keep downlink and uplink transport channels configured to rapidly be able to transmit any user data. At the same time, maintaining a connection in uplink (UL) and downlink (DL) comes at a cost. From a network perspective interference caused by control signalling that takes place even in absence of data transmission is a cost. From a UE perspective power consumption is a main concern.

In the CELL_PCH state dedicated channels in both the uplink and the downlink are used. The UE location is known with an accuracy of the cell. In a Serving Gateway Support Node (SGSN) the UE's serving Radio Network Controller (RNC) is known. The CELL_PCH state corresponds to continuous transmission and reception and allows for rapid transmission of large amounts of user data.

The CELL_FACH state does not use dedicated channels and thus allows reduced battery power consumption, at the expense of a lower uplink and downlink throughput. The UE location is known with an accuracy of cell. In the CELL_FACH state the UE can transmit data as part of a random access procedure.

URA_PCH and CELL_PCH are states in which the battery power consumption is very low but still allow for reasonable fast transitions to the states in which data transfer can occur. The UE location is known with the accuracy of UTRAN Registration Area or cell respectively, however paging is needed to reach the UE. In URA_PCH and CELL_PCH the UE sleeps and only occasionally wakes up to check for paging messages.

The Idle state is the state that has the lowest battery power consumption, but the transition from the Idle state to a state in which data transfer can occur takes the longest time. The UE is known in the SGSN with an accuracy of routing area.

As illustrated in FIG. 4, state transitions are usually initiated due to amount of data in Radio Link Control (RLC) send buffers and due to the length of transmission inactivity. FIG. 4 illustrates the states in order, with the state associated with the highest UE power consumption and shortest transmission delay at the top and the state associated with the lowest UE power consumption and the longest delay before transmission can occur at the bottom. FIG. 4 illustrates that a transition to a lower state is triggered by inactivity, i.e. transmission inactivity, while a transition to a higher state is triggered by RLC buffer level, i.e. if the RLC buffer level is above some specified threshold.

3GPP release 7 provided enhancements of the CELL_FACH state. The enhanced CELL_FACH has the possibility to utilize a High Speed Downlink Shared Channel (HS-DSCH) for downlink transmission instead of a Forward Access channel (FACH) which has a rather limited maximum bit rate. With the use of the HS-DSCH, the bit rates can be improved to around 300-500 Kbps compared to 32 Kbps when using FACH. Note however, that the RRC state is still called CELL_FACH even through the HS-DSCH is used. Sometimes the term enhanced CELL_FACH is used to specify that the HS-DSCH channel is used for downlink transmissions. In 3GPP release 8 a similar enhancement was made to the uplink when Enhanced Dedicated Channel (E-DCH) transmission in CELL_FACH was made possible for data transmission, the access procedure is still similar to that specified according to 3GPP Release 99.

The above mentioned improvement in bit rate is considerable. However, for some real time applications, such as Push-to-talk over Cellular (PoC), another even more important improvement is an almost continuous transmission during channel switching between CELL_FACH and CELL_DCH in 3GPP Release 7 and later releases, while a channel switch between CELL_FACH and CELL_DCH may cause a transmission gap of several 100 ms in 3GPP Release 99. Compared to being in the CELL_DCH state and using HS-DSCH there is no Hybrid automatic repeat request (HARQ) procedure in the CELL_FACH state, but an initial link adaptation may be done using RRC measurement reports.

As illustrated in FIG. 4 a transition from CELL_DCH to CELL_FACH is typically triggered by inactivity. But according to some embodiments of this disclosure, a so-called congestion control channel switching mechanism may be applied such that a UE may be triggered to transition to the CELL_FACH state 42 even if it is actively transmitting or receiving data. When the measured RoT exceeds the first threshold 31 the mechanism tries to find suitable users to switch to CELL_FACH in order to save RoT. The first threshold 31 may for instance be called a FACH_Congestion_RoT_limit and it may be set to a level lower than the above mentioned RoT limit or congestion control indicator 21 if typical congestion control involving dropping of users is implemented in the system. The goal is to reduce the RoT so that it never reaches the congestion control indicator 21 and avoid congestion control involving dropping of users.

When a user is switched to CELL_FACH due to the congestion control channel switching mechanism the UL transmission is done in the CELL_FACH state. This means that a Random Access Channel (RACH) must be used frequently, which implies a longer delay for the user. However, since the option is to drop users in CELL_DCH state this may be an acceptable solution.

Figure 5:
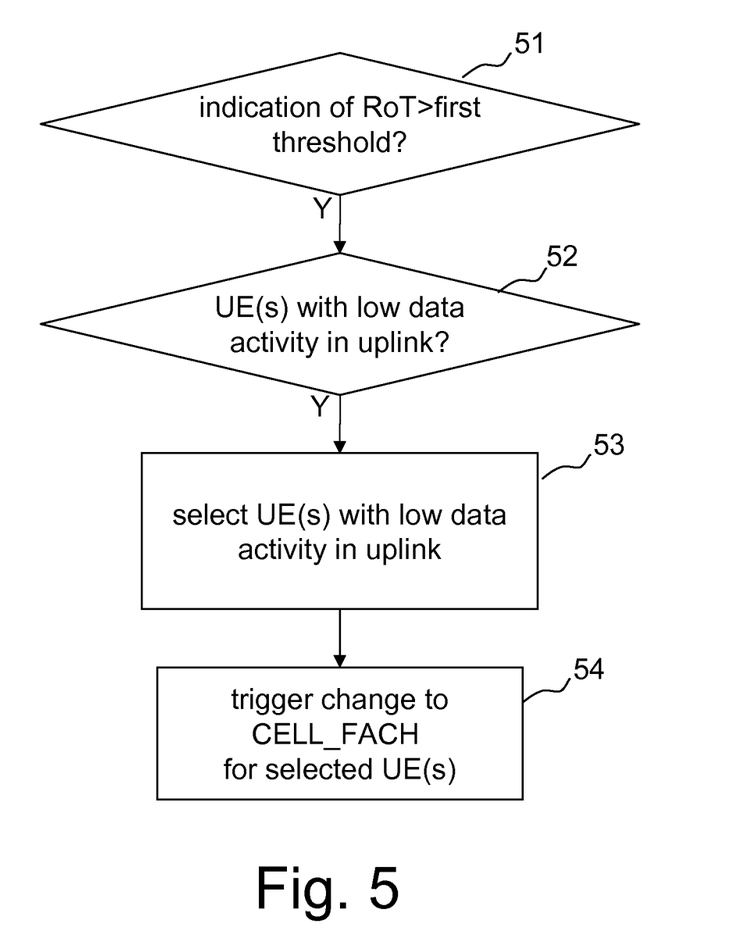
FIG. 5 is a flow diagram illustrating an embodiment of a method for controlling a number of user equipments.

FIG. 5 is a flow diagram illustrating an embodiment of a method for controlling a number of user equipments. The method illustrated in FIG. 5 is an example of an implementation of the congestion control channel switching mechanism discussed above. In this example it is assumed that the RoT is measured in the cell 103a illustrated in FIG. 1 and that the RoT measurement of the cell 103a is transmitted to the RNC 106. The method illustrated in FIG. 5 is assumed to be carried out in the RNC 106 according to this example, although the method may also be carried out in other network nodes as will be discussed further below. The method comprises a step 51 of receiving an indication, here referred to as a first indication, that a rise-over-thermal, RoT, measured in the cell 103a cell is above the first threshold 31. If the RoT exceeds the first threshold 31 the idea is to let the congestion control channel switching mechanism try to find suitable users in the cell 103a to switch to the FACH state. Suitable users are in this context users associated with UEs that demonstrate a low data activity in the uplink—also referred to as "spurious" users or users with "spurious" traffic herein. A user equipment is determined to have a low data activity in the uplink if measured traffic of the user equipment fulfills a set of selected requirements for low data activity in the uplink. Accordingly, a step 52 is carried out in response to reception of the first indication. In the step 52 it is determined if at least one user equipment 101a, 101b, which is in the RRC state CELL_DCH and served by the cell 103a, has a low data activity in the uplink. If one or several UE(s) with low data activity are found in the step 52, at least one user equipment is selected in a step 53. The UE(s) selected in the step 53 will thus be in the RRC state CELL_DCH, served by the first cell and determined to have a low data activity in the uplink. In a step 54 a change of RRC state from CELL_DCH to CELL_FACH is triggered for any UE selected in the step 53. One, a subset or all of the suitable UEs found in the step 52 may, according to different embodiments, be selected for switching to CELL_FACH in the step 53. Default RRC signaling for switching UEs from CELL_DCH to CELL_FACH can be used in the step 54.

Typically there is a delay involved when a UE is switched from CELL_DCH to CELL_FACH using RRC control signalling to the specific UE 101a, 101b, since this signalling message origin from the RNC 106. Thus the effect on the RoT will only be visible after some delay. However, immediately after, i.e. in the same Transmission Time Interval (TTI) the decision to switch users to FACH has been made, the RoT after the switch could be re-estimated by e.g. the RNC 106. If the re-estimated RoT still indicates that the RoT in the cell 103a exceeds the first threshold, some alternative embodiments try to find suitable users to down-switch in adjacent cells, such as the cell 103b, in the same manner as described above. These users should preferably be close to the cell-edge bordering the cell 103a, since it is those users that create most interference to cell 103a.

Figure 6:
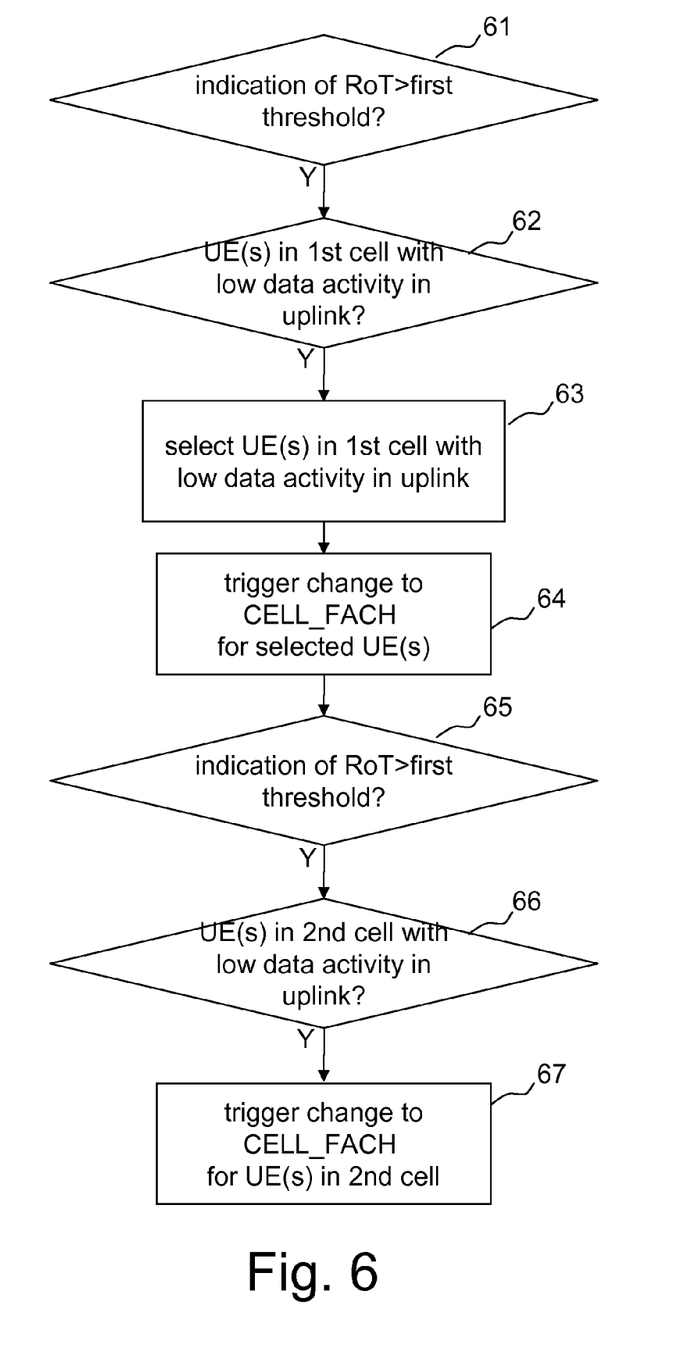
FIG. 6 is a flow diagram illustrating an alternative embodiment of a method for controlling a number of user equipments.

FIG. 6 is a flow diagram illustrating an exemplary alternative embodiment of a method according to which UE(s) in an adjacent cell may be switched to CELL_FACH in case the RoT level is still high after down-switch of some UE(s) in the cell being considered. The method illustrated in FIG. 6 comprises steps 61-64 which corresponds to steps 51-54 of FIG. 5 respectively. In this example we assume that it is the RoT of the cell 103a that is the main concern. In the steps 62-64 it is then only the UEs, such as UEs 101a and 101b, which are served by the cell 103a that are considered. In a step 65 a second indication of the RoT of the cell 103*a* is received. The second indication indicates the RoT re-estimated after the change of RRC state which was triggered in the step 64 has been executed. The re-estimated RoT may be based on a new RoT measurement, but there may be a considerable delay involved in obtaining such a new measurement. Instead, according to certain embodiments, the RoT is re-estimated based on a previous RoT measurement. Typically each UE's contribution to RoT is continuously calculated based on the users bit rate and signal-to-interference ratio (SIR) target. If a UE is switched to CELL_FACH, the UEs contribution to RoT can be subtracted from the previous RoT measurement. Thus it is possible to obtain the re-estimated RoT without having to wait for an actual RoT measurement before carrying out the step 65. If the second indication indicates that the RoT of the first cell is still above the first threshold, it is determined in a step 66 if there is a UE in an adjacent cell that is suitable to down-switch to CELL_FACH. Here we assume that the adjacent cell is the cell 103*b*. Accordingly the step 66 involves determining if at least one user equipment served by the cell 103, such as the UE 101*c* and 101*d*, is in the RRC state CELL_DCH and has a low data activity in the uplink. If one or several suitable UEs are found in the step 66, a change of RRC state to CELL_FACH is triggered for one or several of those UEs in a step 67. One, a subset or all of the UE(s) found in the step 66 may be triggered to switch to CELL_FACH in the step 67, according to different embodiments. However, as mentioned above it is the UEs that are close to the cell-edge bordering the cell 103*a* that create most interference to cell 103*a*. Therefore, according to certain embodiments, only UEs that are close to the cell-edge bordering the cell 103*a* are considered suitable candidates to down-switch to CELL_FACH, such that the step 66 and/or the step 67 only considers any UE served by the cell 103*b* that is close to the cell-edge bordering the cell 103*a*.

Since there is no direct way to know where a UE is located, a simple method to find these cell edge UEs is to assume it is the UEs in soft handover, preferably with the overloaded cell 103*a* in this example. However, the UE should still have spurious traffic, i.e. low data activity in the uplink, to be a suitable candidate for down-switch to CELL_FACH. There are also other alternative ways to find the cell edge UEs. Another option may be to use power headroom measurements from the UEs which can give an indication of whether or not a UE is likely to be close to the cell edge. A power headroom limit may e.g. be determined and UEs for which a power headroom measurement indicates a power headroom below the predetermined power headroom limit may be considered to be close to the cell-edge. However, the power headroom measurements are not always available.

According to some embodiments, after a UE has been switched to CELL_FACH, the threshold for state transition from CELL_FACH to CELL_DCH is increased for that UE to an increased threshold. The increased threshold may be maintained as long as the RoT of the cell in question is above the first threshold 31 in order to prevent a switch back to CELL_DCH.

According to a certain embodiment, if a UE is found to have spurious traffic while in the CELL_DCH state, it is always switched to CELL_FACH regardless of the RoT level of the cell. This embodiment can be seen as equivalent to setting the first threshold 31 to zero.

As mentioned above, a criterion to find UEs that are suitable for a switch from CELL_DCH to CELL_FACH is UEs with rather low data activity in the UL. UEs with low activity in the UL have the highest probability to decrease the interference contribution after a switch from the CELL_DCH to the CELL_FACH state. This since users with spurious occasional UL (and DL) transmissions can turn off their DPCCH completely after UL transmission while in the CELL_FACH state. To find UEs with low data activity in the UL, "spurious UL traffic", different sets of requirements can be selected and used to determine if the UE has low data activity in the uplink. Some different examples of such requirements will now be discussed.

A first example of determining if a UE has low data activity in the uplink is to measure the user bit rate for a relatively long period, e.g. 10 seconds. Further on, the user bit rate is also measured for a plurality of shorter periods, e.g. 0.5 seconds each. If the bit rate for the long period is low, below a first level, and the bit rate for the shorter periods is alternating zero and non-zero, the UL traffic can be considered spurious.

A second example is to consider UEs with low average long-term bit rate suitable candidates for down-switch to CELL_FACH. Accordingly if an average uplink bit rate of a UE for a selected period is below some predetermined level the UE may be determined to have a low data activity in the UL. It may however, be desirable, as a first choice, to down-switch users with sporadic, occasional traffic rather than UEs with low, continuous traffic. Therefore this requirement on the average uplink bit rate may often be combined with other requirements indicating occasional uplink traffic.

A third example of a way to determine that a UE has low data activity in the uplink is to measure data burst inter arrival times (IAT) of the UL traffic for each UE. The average measured IATs are compared to an IAT threshold to decide what is defined as spurious traffic. The IAT threshold may e.g. be set to a few seconds. An alternative is to not only consider IATs combined with average data burst size. An average IAT of a few seconds may e.g. be seen as a definite indication of spurious traffic, while an average IAT of 0.5 s also may indicate spurious traffic provided that the average data burst size is small.

A fourth example, related to the third example described above, is to create a cumulative distribution function (CDF) of the IAT measurements and compare to a reference CDF in order to decide if the traffic is spurious or not. For example, at least 90% of the IATs must be larger than a specific value in order to be considered as spurious.

A fifth example of a way to determine that a UE has low data activity in the uplink is to use deep packet inspection, and identify the traffic as HTTP type traffic, which typically means that it is a web browsing session or other downloading traffic implying low data activity in the uplink. HTTP traffic can be identified both in the UL and in the DL. This can be done e.g. in the RNC 106.

According to some alternative embodiments UEs are ordered according to how spurious traffic they have. The user with most spurious traffic, i.e. least data activity in the uplink, is first selected to switch to CELL_FACH state. If the re-estimated RoT still indicates that the RoT exceeds the first threshold 31, the UE with the second most spurious traffic is selected for a switch to the CELL_FACH state. This may be repeated until the re-estimated RoT is below the first threshold 31.

The downlink traffic will be affected negatively of the switch from the CELL_DCH state to the CELL_FACH state and therefore it may be desirable to find users with limited traffic in DL too. Therefore, in addition to one or several of the requirements discussed above for finding suitable UEs, UEs with average bit rate lower than a downlink bit rate threshold may be selected first.

According to some embodiments the process of finding one or several suitable UEs to down-switch to CELL_FACH is carried out in several elimination steps. It is e.g. possible to first sort out all of the UEs which are served by a cell in question and which have an average long term bit rate below a predetermined bit rate level. Thereafter it can be determined if any of the UEs which have been sorted out has a low data activity in the uplink.

Figure 7:
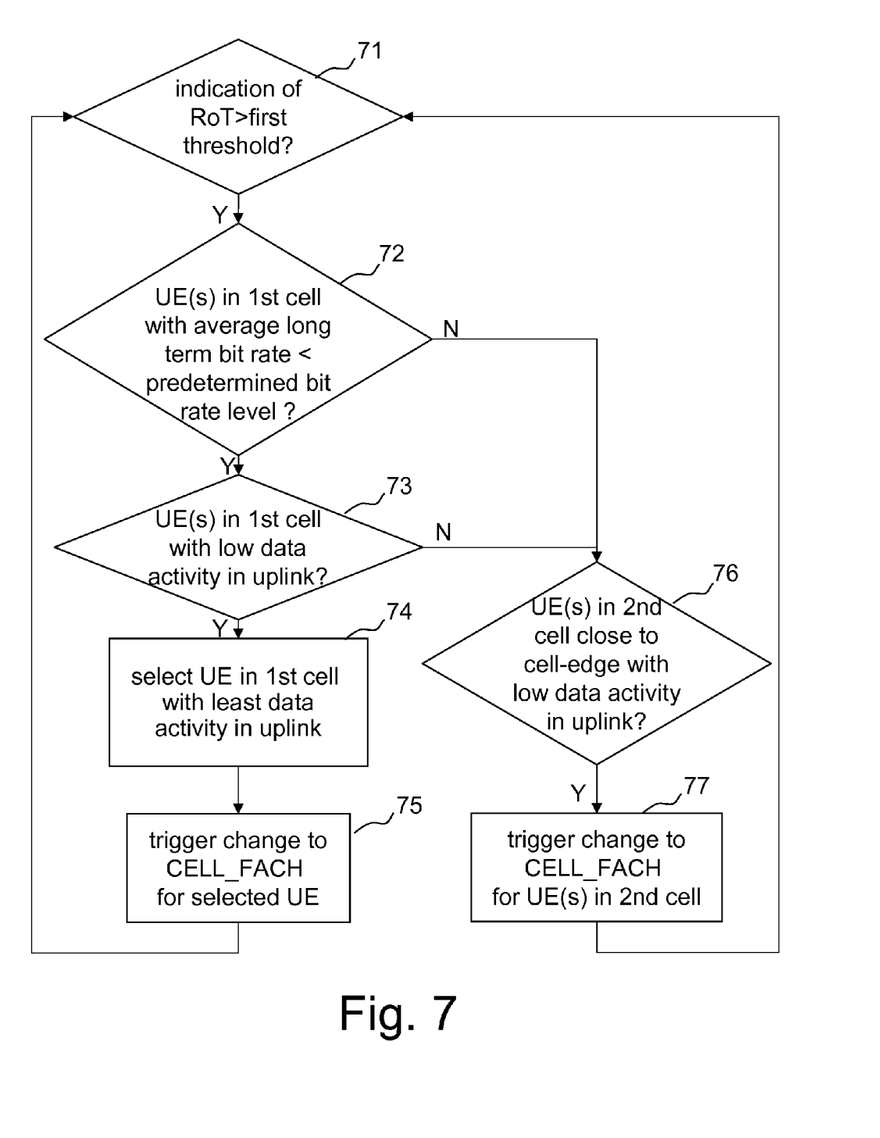
FIG. 7 is a flow diagram illustrating another alternative embodiment of a method for controlling a number of user equipments.

FIG. 7 is a flow diagram illustrating another alternative embodiment of a method for controlling a number of user equipments. The method in FIG. 7 combines several of the features discussed above. The method comprises a step 71, corresponding to steps 51 and 61 of FIGS. 5 and 6 respectively. In a step 72 it is determined if there are UEs in the cell is question (here we again assume that it is the cell 103a) with an average long term bit rate below a predetermined bit rate level. The step 72 functions as a first elimination step in the process of finding one or several suitable UEs to down-switch to CELL_FACH. If there is any UE with an average long term bit rate below a predetermined bit rate level found in the step 72, it is examined in the step 73 if any UE found in the step 72 has a low data activity in the uplink. Provided that at least one such UE is found in the step 73, the UE which is considered to have the least data activity in the uplink is selected in a step 74. In a step 75 a state change from CELL_DCH to CELL_FACH is triggered to the UE which was selected in the step 74. If no suitable UE is found in the step 72 or in the step 73, a step 76 is carried out in which it is determined if there are any suitable UEs to down-switch in an adjacent cell, such as the cell 103b, which could improve the RoT situation in the cell 103a. In this example UEs in the adjacent cell which are close to the cell edge and have a low data activity in the uplink are considered to be suitable to down-switch to CELL_FACH. Provided that at least one suitable UE was found in the step 76, one or several of the UE(s) found can be triggered to change state from CELL_DCH to CELL_FACH in a step 77. After triggering a state change in the step 75 or 77 the RoT of the cell 103a may be re-estimated and the method may be repeated based on the re-estimated RoT level.

The methods described above may advantageously be implemented in the RNC 106, although implementation in other types of network nodes is also conceivable. The method illustrated in FIG. 5 may be implemented in the radio base station 102a or 102b. However the methods illustrated in FIGS. 6 and 7 need to be implemented in a network node that has the ability to influence RRC states in one or several adjacent cells. Thus the RNC is an appropriate node since it controls several cells. There may also be a centralized or coordinated NodeB, which coordinates several cells in different positions but adjacent to each other. Such a centralized or coordinated base station/NodeB may be suitable for implementation of methods such as illustrated in FIG. 6 or 7.

Figure 8:
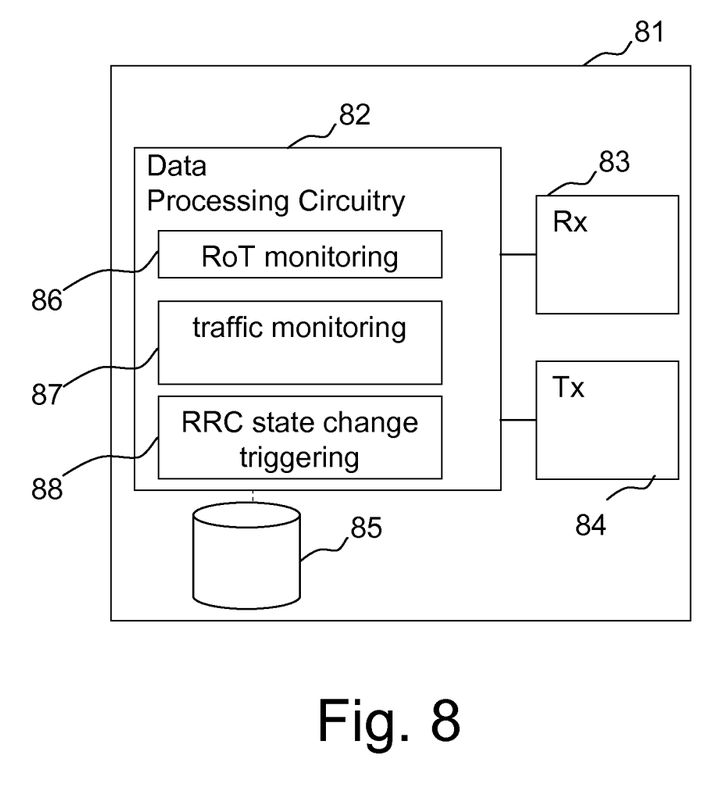
FIG. 8 is a schematic block diagram of an embodiment of an apparatus for controlling a number of user equipments.

FIG. 8 is a schematic block diagram of an exemplary embodiment of an apparatus 81 for controlling a number of user equipments operating in a cellular network. The apparatus 81 may e.g. be comprised in an RNC and the components of the apparatus may thus be integrated with other components of the RNC. The apparatus 81 is adapted to perform the method according to FIG. 5, FIG. 6 or FIG. 7. As illustrated in FIG. 8, the apparatus 81 comprises data processing circuitry 82, a receiver 83 for reception of data messages and a transmitter 84 for transmission of data messages. The receiver 83 and the transmitter 84 may alternatively be integrated in a transceiver unit. The receiver 83 is particularly adapted to receive indications, such as signalling messages, indicating the RoT measured in a cell. The transmitter 84 is particularly adapted to transmit signalling messages to trigger RRC state changes for one or several UE(s) when the transmitter is triggered to do so by the data processing circuitry 82. The data processing circuitry 82 is particularly configured to perform or control the method steps illustrated in FIGS. 5-7. For this purpose the data processing circuitry may be configured to execute different program modules. In FIG. 8, three exemplary program modules 86, 87 and 88 are illustrated. The program module 86 is a module for RoT monitoring, such as comparison of the measured RoT level of the cell to the first threshold 31. The program module 87 is a module for traffic monitoring, such as determining if a UE has a low data activity in the uplink.

The program module 88 is a RRC state change triggering module for triggering RRC state changes of selected UEs. The program modules are merely some examples and other program modules may be used in alternative embodiments. The apparatus 81 in FIG. 8 also includes an optional memory 85. The memory 85 may e.g. store the program modules 86, 87 and 88 and/or RoT measurements values that are to be retained if a later re-estimation of the RoT in a cell is to be based on a previous measurement. The data processing circuitry 82 may be embodied in the form of one or more programmable processors programmed to perform the steps according to FIG. 5, FIG. 6 and/or FIG. 7. However, any data processing circuitry or combination of different types of processing circuits that is capable of performing the mentioned steps could be used. The program modules 86, 87 and 88, may be comprised in one or several computer program products embodied in the form of a volatile or non-volatile memory, e.g. a RAM, an EEPROM, a flash memory or a disc drive.

From the description above it is apparent that an advantage of some embodiments described above is that they make it possible to keep the RoT level in a cell down. By keeping the RoT down, dropping of users due to congestion control caused by too high RoT can hopefully be avoided. RoT decreases when a UE is switched from CELL_DCH to CELL_FACH since the continuous DPCCH is not transmitted. A typical trigger, according to previously known solutions, of a state change from CELL_DCH to CELL_FACH is inactivity e.g. after 2 seconds of inactivity in both uplink and downlink. According to embodiments presented herein a UE may be triggered to down-switch to CELL_FACH even if the UE is active, leading to an even further decrease of RoT. When selecting UEs suitable for down-switch to CELL_FACH the UEs data activity in the uplink is primarily considered.

Another advantage of some embodiments described herein is that they can be easily combined with other types of congestion control and measures for keeping RoT down. It is e.g. possible to provide early congestion control with limited negative impact on user QoS before more drastic congestion control measures, which affect user QoS more severely, are taken. Even if a RRC state change from CELL_DCH to CELL_FACH may lower the QoS experienced by a user, it is a much less negative impact than dropping the user completely. It is also possible to combine the embodiments disclosed herein with Continuous Packet Connectivity (CPC), which involves discontinuous transmission in the uplink. CPC can decrease the RoT in a cell and by also combining with embodiments disclosed herein, the RoT in the cell can be decreased even further. However, if a UE does not have CPC it may be especially interesting to use the embodiments described above in order to decrease the UEs contribution to the RoT of the cell.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A method for controlling a number of user equipments operating in a cellular network, the method comprising:
   a network node receiving a first indication that a rise-over-thermal, RoT, measured in a first cell is above a first threshold;
   in response to reception of said first indication, the network node determining if at least one user equipment, which is in a Radio Resource Control (RRC), state of CELL_DCH and served by the first cell, has a low data activity in the uplink, wherein a user equipment is determined to have a low data activity in the uplink if measured traffic of the user equipment fulfills a set of selected requirements for low data activity in the uplink;
   the network node selecting at least one user equipment, which is in the CELL_DCH state, is served by the first cell and is determined to have a low data activity in the uplink; and
   the network node triggering change of RRC state for the at least one selected user equipment from the CELL_DCH state to a RRC state CELL_FACH.

2. The method according to claim 1, wherein said set of selected requirements for low data activity in the uplink comprises one or more of:
   a measured uplink bit rate for a selected first period is below a first level and measured bit rates for a plurality of periods, which are shorter than the first period, are alternating zero and non-zero;
   an average uplink bit rate for a selected second period is below a second level;
   an average of measured data burst inter arrival times of the uplink traffic is above an inter arrival time threshold;
   a comparison of a cumulative distribution function, CDF, of measured data burst inter arrival times of the uplink traffic and a reference CDF indicates low data acitivity; and
   the traffic of the user equipment is identified as HTTP type traffic.

3. The method according to claim 1, wherein said step of selecting at least one user equipment involves selecting every user equipment in the RRC state CELL_DCH, that is served by the first cell and determined to have a low data activity in the uplink.

4. The method according to claim 1, wherein said step of selecting at least one user equipment involves selecting any user equipment with an average downlink bit rate lower than a downlink bit rate threshold.

5. The method according to claim 1,
   wherein said step of selecting at least one user equipment involves ranking, based on data activity in the uplink, any user equipment which is in the RRC state CELL_DCH, is served by the first cell and is determined to have a low data activity in the uplink, and selecting the user equipment with the least data activity in the uplink, and
   wherein the method is repeated until an indication is received that indicates that the RoT of the first cell, re-estimated after the change of RRC state has been executed for the at least one selected user equipment, is no longer above the first threshold.

6. The method according to claim 1, further comprising
   obtaining a second indication of the RoT of the first cell, re-estimated after the change of RRC state has been executed for the at least one selected user equipment;
   if the second indication indicates that the RoT of the first cell is still above the first threshold, determining if at least one user equipment, which is in the RRC state CELL_DCH (41) and served by a second cell adjacent to the first cell, has a low data activity in the uplink; and
   triggering change of RRC state for at least one user equipment, which is in the RRC state CELL_DCH, is served by the second cell and is determined to have a low data activity in the uplink to the RRC state CELL_FACH.

7. The method according to claim 6, wherein said at least one user equipment, which is served by the second cell and which is triggered to change RRC state is at least one user equipment which is estimated to be close to the cell-edge bordering the first cell.

8. The method according to claim 7, wherein a user equipment is estimated to be close to the cell-edge bordering the first cell if the user equipment is in soft handover with the first cell or a power headroom of the user equipment is indicated to be below a predetermined power headroom limit.

9. The method according to claim 1, further comprising a step of sorting out any user equipment served by the first cell with an average long term bit rate below a predetermined bit rate level and performing said step of determining if at least one user equipment has a low data activity in the uplink on any user equipment which has been sorted out.

10. The method according to claim 1, wherein a threshold for changing from the RRC state CELL_FACH to the RRC state CELL_DCH is increased to an increased threshold for said at least one user equipment triggered to change to the RRC state CELL_FACH, and wherein the increased threshold is maintained as long as the RoT of the first cell is above a predetermined second threshold.

11. The method according to claim 1, further comprising re-estimating the RoT of the first cell based on said first indication and taking into account that the change of RRC state has been executed for at least one selected user equipment.

12. The method according to claim 1, wherein said first threshold is lower than a congestion control indicator used for triggering a congestion control action involving dropping of at least one user equipment.

13. An apparatus for controlling a number of user equipments operating in a cellular network, the apparatus comprising:
   a receiver configured to receive a first indication that a rise-over-thermal, RoT, measured in a first cell (103a) is above a first threshold, and
   data processing circuitry configured to:
   in response to reception of said first indication, determine if at least one user equipment, which is in a Radio Resource Control, RRC, state CELL_DCH and served by the first cell, has a low data activity in the uplink, wherein a user equipment is determined to have a low data activity in the uplink if measured traffic of the user equipment fulfills a set of selected requirements for low data activity in the uplink;
   select at least one user equipment, which is in the RRC state CELL_DCH, is served by the first cell and is determined to have a low data activity in the uplink; and
   trigger change of RRC state for the at least one selected user equipment from the RRC state CELL_DCH to a RRC state CELL_FACH.

14. The apparatus according to claim 13, wherein said set of selected requirements for low data activity in the uplink comprises one or more of:
   a measured uplink bit rate for a selected first period is below a first level and measured bit rates for a plurality of periods, which are shorter than the first period, are alternating zero and non-zero;

an average uplink bit rate for a selected second period is below a second level;

an average of measured data burst inter arrival times of the uplink traffic is above an inter arrival time threshold;

a comparison of a cumulative distribution function, CDF, of measured data burst inter arrival times of the uplink traffic and a reference CDF indicates low data activity; and the traffic of the user equipment is identified as HTTP type traffic.

15. The apparatus according to claim 13, wherein the data processing circuitry is configured to select every user equipment which is in the RRC state CELL_DCH, is served by the first cell and is determined to have a low data activity in the uplink.

16. The apparatus according to claim 13, wherein the data processing circuitry is configured to select any user equipment with an average downlink bit rate lower than a downlink bit rate threshold.

17. The apparatus according to claim 13, wherein the data processing circuitry is configured to rank, based on data activity in the uplink, any user equipment which is in the RRC state CELL_DCH, is served by the first cell and is determined to have a low data activity in the uplink, and selecting the user equipment with the least data activity in the uplink.

18. The apparatus according to claim 13, wherein the data processing circuitry is further configured to:

obtain a second indication of the RoT of the first cell, re-estimated after the change of RRC state has been executed for the at least one selected user equipment;

if the second indication indicates that the RoT of the first cell is still above the first threshold, determine if at least one user equipment, which is in the RRC state CELL_DCH and served by a second cell adjacent to the first cell, has a low data activity in the uplink; and trigger change of RRC state for at least one user equipment, which is in the RRC state CELL_DCH, is served by the second cell and is determined to have a low data activity in the uplink to the RRC state CELL_FACH.

19. The apparatus according to claim 18, wherein said at least one user equipment, which is served by the second cell and which the data processing circuitry is configured to trigger to change RRC state is at least one user equipment which is estimated to be close to the cell-edge bordering the first cell.

20. The apparatus according to claim 19, wherein the data processing circuitry is configured to estimate that a user equipment is close to the cell-edge bordering the first cell if the user equipment is in soft handover with the first cell or a power headroom of the user equipment is indicated to be below a predetermined power headroom limit.

21. The apparatus according to claim 13, wherein the data processing circuitry is further configured to sort out any user equipment served by the first cell with an average long term bit rate below a predetermined bit rate level and further configured to, when determining if at least one user equipment has a low data activity in the uplink, only consider any user equipment which has been sorted out.

22. The apparatus according to claim 13, wherein the data processing circuitry is further configured to increase a threshold for changing from the RRC state CELL_FACH to the RRC state CELL_DCH to an increased threshold for at least one user equipment (101a, 101b, 101c, 101d) triggered to change to the RRC state CELL_FACH and to maintain the increased threshold as long as the RoT of the first cell is above a predetermined second threshold.

23. The apparatus according to claim 13, wherein the data processing circuitry is further configured to re-estimate the RoT of the first cell based on said first indication and taking into account that the change of RRC state has been executed for at least one selected user equipment.

24. The apparatus according to claim 13, wherein said first threshold is lower than a congestion control indicator used for triggering a congestion control action involving dropping of at least one user equipment.

25. The apparatus according to claim 13, wherein the apparatus is comprised in a Radio Network Controller or a NodeB coordinating multiple cells of the cellular network.

* * * * *